United States Patent
Andreani et al.

(10) Patent No.: US 12,428,133 B2
(45) Date of Patent: Sep. 30, 2025

(54) WING FOR AN AIRCRAFT

(71) Applicant: Airbus Operations GmbH, Hamburg (DE)

(72) Inventors: Luc Andreani, Hamburg (DE); Dennis Krey, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/173,886

(22) Filed: Feb. 24, 2023

(65) Prior Publication Data

US 2023/0271696 A1   Aug. 31, 2023

(30) Foreign Application Priority Data

Feb. 28, 2022   (DE) .......................... 102022104706.7

(51) Int. Cl.
    *B64C 13/04*    (2006.01)
    *B64C 9/20*     (2006.01)
    *B64C 13/28*    (2006.01)

(52) U.S. Cl.
    CPC ............... *B64C 13/28* (2013.01); *B64C 9/20* (2013.01); *B64C 13/0425* (2018.01)

(58) Field of Classification Search
    CPC .......... B64C 9/20; B64C 13/0425; B64C 9/34
    See application file for complete search history.

(56) References Cited

U.S. PATENT DOCUMENTS

| | | | | |
|---|---|---|---|---|
| 2,169,416 A | * | 8/1939 | Griswold | ................. B64C 9/16 244/216 |
| 2,188,083 A | * | 1/1940 | Koppen | .................... B64C 9/16 244/216 |
| 4,381,093 A | * | 4/1983 | Rudolph | ................... B64C 9/16 244/219 |
| 4,544,118 A | | 10/1985 | Robinson | |
| 4,702,442 A | * | 10/1987 | Weiland | .................... B64C 9/16 244/218 |

(Continued)

FOREIGN PATENT DOCUMENTS

| | | |
|---|---|---|
| DE | 4107556 C1 | 5/1992 |
| EP | 0227643 A2 | 7/1987 |

(Continued)

OTHER PUBLICATIONS

German Search Report for German Patent Application No. 102022104706.7 dated Jul. 13, 2022; priority document.

(Continued)

*Primary Examiner* — Brian M O'Hara
(74) *Attorney, Agent, or Firm* — Greer, Burns & Crain, Ltd.

(57) ABSTRACT

A wing for an aircraft. The wing includes a main wing and a trailing edge high lift assembly movably arranged at a trailing edge of the main wing. The trailing edge high lift assembly includes a flap and a connection assembly movably mounting the flap to the main wing, such that the flap is movable between a retracted position and at least one extended position, wherein the connection assembly is configured such that the flap is movable relative to the main wing in a linear and/or rotational manner. The connection assembly is configured such that the flap is movable relative to the main wing in a decoupled linear and rotational manner.

16 Claims, 3 Drawing Sheets

(56) References Cited

U.S. PATENT DOCUMENTS

| | | | | |
|---|---|---|---|---|
| 5,230,487 | A * | 7/1993 | Gartelmann | B64C 9/16 |
| | | | | 244/219 |
| 9,868,512 | B2 * | 1/2018 | Bastiaansen | B64C 9/16 |
| 10,538,309 | B2 | 1/2020 | Lorenz | |
| 10,899,431 | B2 * | 1/2021 | Lorenz | B64C 13/40 |
| 11,208,199 | B2 * | 12/2021 | Tfaily | B64C 7/00 |
| 11,352,122 | B2 | 6/2022 | Gibbert et al. | |
| 11,820,490 | B1 * | 11/2023 | Tsai | B64C 1/38 |
| 11,858,629 | B2 * | 1/2024 | Foskey | B64C 9/16 |
| 2015/0291275 | A1 | 10/2015 | Bastiaansen et al. | |
| 2019/0210711 | A1 | 7/2019 | Lorenz | |
| 2023/0024601 | A1 * | 1/2023 | Kelly | B64C 9/323 |

FOREIGN PATENT DOCUMENTS

| | | | |
|---|---|---|---|
| EP | 2917101 | B1 | 12/2016 |
| EP | 3301017 | A1 | 4/2018 |
| EP | 3301018 | A1 | 4/2018 |
| EP | 3617058 | A1 | 3/2020 |
| EP | 3670330 | A1 | 6/2020 |

OTHER PUBLICATIONS

European Search Report for corresponding European U.S. Appl. No. 23/157,834 dated Jun. 30, 2023; priority document.

* cited by examiner

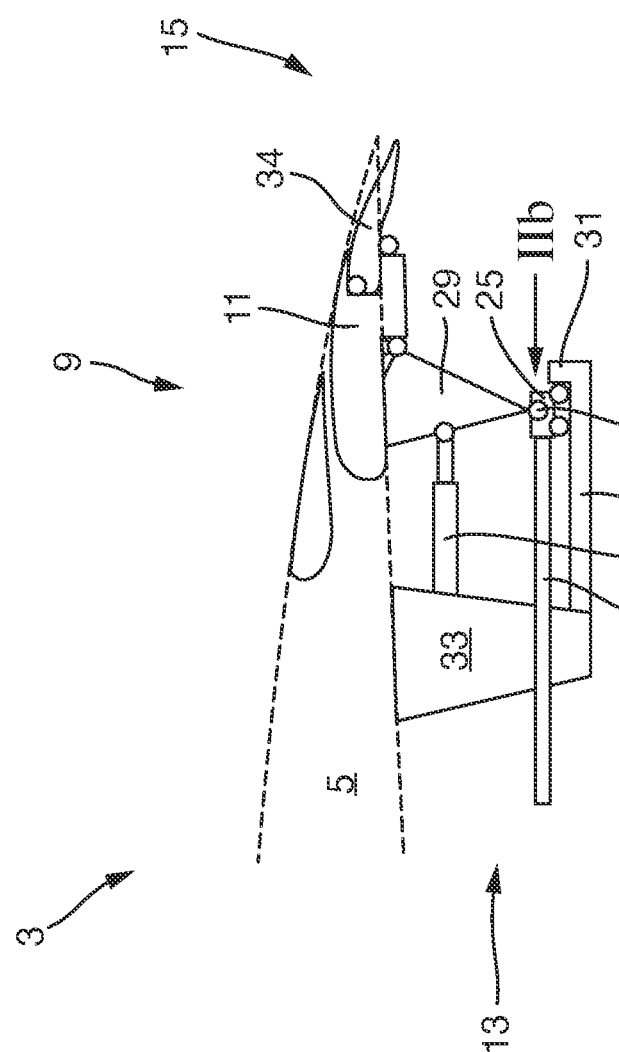

WING FOR AN AIRCRAFT

CROSS-REFERENCES TO RELATED APPLICATIONS

This application claims the benefit of the German patent application No. 10 2022 104 706.7 filed on Feb. 28, 2022, the entire disclosure of which is incorporated herein by way of reference.

FIELD OF THE INVENTION

The present invention relates to a wing for an aircraft. Further aspects of the invention relate to a trailing edge high lift assembly for such a wing, and to an aircraft comprising such a wing and/or comprising such a trailing edge high lift assembly.

The wing comprises a main wing and a trailing edge high lift assembly. The trailing edge high lift assembly is movably arranged at a trailing edge of the main wing and comprises a flap and a connection assembly. The connection assembly movably mounts the flap to the main wing, such that the flap is movable between a retracted position with a reduced chord length and/or curvature of the wing, and at least one extended position with an extended chord length and/or curvature of the wing. The connection assembly is configured such that the flap is movable relative to the main wing in a linear, i.e. translational, and/or rotational manner.

BACKGROUND OF THE INVENTION

Such wings are commonly known in the art. Some known wings comprise a trailing edge high lift assembly having a flap that is movable relative to the main wing in a rotational manner, e.g., by the flap being fixedly mounted on a lever that is rotatably mounted to the trailing edge of the main wing and that is driven by a drive strut mounted to a rotating drive arm. Other known wings have a trailing edge high lift assembly with a flap that is movable relative to the main wing in a combined linear and rotational manner, e.g., by the flap being rotatably mounted on a carriage running along a linear guide rail while the flap is driven by a drive strut mounted to a rotating drive arm, so that the flap carries out a coupled linear and rotational motion. Such trailing edge high lift assemblies are designed to be deployed during take-off and landing of an aircraft to increase lift and reduce minimum air speed by increasing wing area, curvature, and angle of attack, and to be retracted during cruise flight when air speed is high to reduce drag. However, more recent investigations have shown that it might be advantageous to have a morphing wing that might adjust wing area, curvature, and angle of attack during the entire flight, e.g., as a "real-time" response to gust or to optimise lift, drag and structural loading during the flight.

SUMMARY OF THE INVENTION

The object of the invention is to provide a wing having a trailing edge high lift assembly that allows to adjust the shape of the wing more freely.

This object is achieved in that the connection assembly is configured such that the flap is movable relative to the main wing in a decoupled linear and rotational manner, i.e., the flap is movable linearly and rotationally independent from one another. In other words, the linear degree of freedom is decoupled from the rotational degree of freedom. In such a way, the flap cannot only be moved along a single predefined path, but can be adjusted more freely to result is multiple different shapes of the wing that can be assumed during all stages of flight to optimise flight parameters such as lift, drag, structural loading and passenger comfort.

According to a preferred embodiment, the connection assembly comprises at least a first actuator and a second actuator for moving the flap. At least the first actuator, i.e., the first actuator alone or the first actuator together with the second actuator, is configured to cause linear movement of the flap. At least the second actuator, i.e., the second actuator alone or the second actuator together with the first actuator, is configured to cause rotational movement of the flap. In such a way, the linear and rotational degrees of freedom can be adjusted by the first and second actuators.

According to another preferred embodiment, the connection assembly comprises a guide rail, preferably a linear guide rail, mounted to the main wing, preferably fixedly mounted to the main wing. The connection assembly further comprises a carriage engaging the guide rail for guided movement along the guide rail. Preferably, the flap is mounted to the carriage. By such a carriage, the flap can be moved along the guide rail in a simple and efficient manner.

In particular, it is preferred that the flap is rotatably mounted to the carriage by a hinge. In such a way, the flap can be rotated about the hinge and moved along the guide rail, at the same time or independent from one another, e.g., subsequently.

It is further preferred that the flap is mounted to the carriage via a lever element. The lever element is mounted to or provided at the flap, preferably fixedly mounted to or provided at the flap, preferably the lower side of the flap, preferably such that it extends away from the lower side of the flap. The lever element is preferably rotatably mounted to the carriage via the hinge. In such a way, the flap can be rotated by the lever element rotating about the hinge, and can be moved along the guide rail by the carriage together with the lever element moving along the guide rail.

It is also preferred that the first actuator is coupled to the carriage for moving the carriage along the guide rail. Additionally or alternatively, the second actuator is coupled to the lever element, preferably rotatably coupled to the lever element, in a position spaced apart from the hinge, to be able to rotate the lever element about the hinge. In such a way, by a respective movement of the first and second actuators the carriage can be moved along the guide rail and the lever element can be rotated about the hinge on the carriage, so that the flap can be rotated and linearly moved as desired to several different positions and orientations.

According to a preferred embodiment, the first actuator is a linear actuator, preferably a hydraulic or pneumatic cylinder or an electromagnetic linear motor. Alternatively, the first actuator is a pinion drive actuator, preferably mounted to the carriage and engaging corresponding teeth at the guide rail. Also, a chain drive actuator or belt drive actuator would be a possible form for the first actuator. Preferably, the second actuator is a linear actuator, preferably a hydraulic or pneumatic cylinder or an electromagnetic linear motor. Such actuator options are efficient and reliable and are easy to integrate.

According to an alternative preferred embodiment, the first actuator is a gas spring actuator, such as a passive gas spring. Preferably, the guide rail has a stop, preferably a structural stop, to limit linear movement of the carriage along the guide rail, but preferably allow rotation of the lever element about the hinge also after the carriage hit the stop. Preferably, the gas spring actuator is biased to push the carriage towards and against the stop. Preferably, the second actuator is a linear actuator, preferably a hydraulic or pneumatic cylinder or an electromagnetic linear motor. Such a gas spring actuator represents a very simple, efficient, and reliable actuator option. This embodiment allows a subsequent linear and rotational movement path, wherein first both first and second actuators push the carriage and the lever element in parallel, so that the flap carries out only linear motion, until the carriage is stopped at the stop, whereupon only the second actuator continues pushing the lever element and thereby causes the flap to rotate about the hinge without any linear movement present.

According to a preferred embodiment, the first actuator and/or the second actuator is mounted to or supported at the main wing via a rib that is mounted to or provided at the main wing, preferably fixedly mounted to or provided at the main wing, preferably at the lower side of the main wing, preferably such that it extends away from the lower side of the main wing. In such a way, the rib may form an effective attachment and counter bearing for the first and/or second actuator. Preferably, the rib also carries the guide rail, i.e., the guide rail is mounted to the main wing via the rib.

According to a further preferred embodiment, the flap might comprise at least one further adjustable flap portion that might be mounted rotatably at the trailing edge of the flap and that allows to further adjust the shape of the flap and thus the shape of the wing.

According to a further preferred embodiment, the guide rail is arranged directly at the lower side of the main wing, preferably mounted directly to the lower side of the main wing, preferably to the lower skin surface of the main wing. Preferably, the carriage engages the guide rail from below. In such a way, it can be avoided that the guide rail is arranged spaced apart from the main wing and the rib does not need to carry the guide rail. Rather, the rib might be mounted to the main wing via the carriage and the guide rail, where the rib is mounted to the carriage engaging the guide rail mounted to the lower side of the main wing.

In particular, it is preferred that the carriage is mounted to the rib, preferably fixedly mounted to the rib, while the rib is mounted to the lever element rotatably about the hinge. Preferably, the first actuator drives the carriage along the guide rail and is preferably formed as a pinion drive actuator. The second actuator, preferably in the form of a linear actuator, is coupled between the rib and the lever element in a position spaced apart from the hinge and preferably hinged on both ends, i.e., rotatably coupled to the rib at one end and rotatably coupled to the lever element at the opposite end. In such a way, the second actuator may spread the lever element apart from the rib, thereby rotating the lever element together with the flap about the hinge, while the rib mounted to the carriage may be moved along the guide rail. This relates to a very compact and efficient embodiment.

According to an alternative preferred embodiment, the flap is fixedly and preferably directly mounted to the carriage. In such a way, the flap carries out the same movement as the carriage and is directly movable with the carriage.

In particular, it is preferred that a rib is mounted to or provided at the main wing, preferably fixedly mounted to the main wing, preferably the lower side of the main wing. Preferably, the rib is rotatably mounted to a lever element via a hinge. Preferably, the guide rail is mounted to the lever element, preferably fixedly mounted to the lever element. Preferably, the first actuator, preferably a linear actuator, is coupled between the main wing and the flap, preferably in a hinged manner, i.e., in a manner rotatable at the main wing by one end and rotatable at the flap by the opposite end. Preferably, the second actuator, preferably a linear actuator, is coupled between the rib and the lever element, preferably in a manner hinged on both ends, i.e., rotatably coupled to the rib at one end and rotatably coupled to the lever element at the opposite end. In such a way, a further very compact and efficient trailing edge high lift assembly is provided.

A further aspect of the present invention relates to a trailing edge high lift assembly for the wing according to any of the embodiments explained above. The features and effects explained above in connection with the wing apply vis-à-vis also to the trailing edge high lift assembly.

A further aspect of the present invention relates to an aircraft comprising the wing according to any of the embodiments explained above, and/or comprising the trailing edge high lift assembly according to any of the embodiments explained above. The features and effects explained above in connection with the wing and the trailing edge high lift assembly apply vis-à-vis also to the aircraft.

BRIEF DESCRIPTION OF THE DRAWINGS

Hereinafter, preferred embodiments of the present invention are described in more detail by means of a drawing. The drawing shows in FIG. 1 a perspective view of an aircraft according to an embodiment of the invention, FIG. 2a a schematic cross-sectional view of a wing, across the span direction, according to a first embodiment of the invention FIG. 2b a detailed front view of the carriage and hinge shown in FIG. 2a, FIG. 3a a schematic cross-sectional view of a wing according to a second embodiment of the invention showing the flap in the retracted position, FIG. 3b a schematic cross-sectional view of the wing in FIG. 3a with the flap in an extended position, and FIG. 4 a schematic cross-sectional view of a wing according to a third embodiment of the invention.

DETAILED DESCRIPTION OF THE PREFERRED EMBODIMENTS

Figure 1:
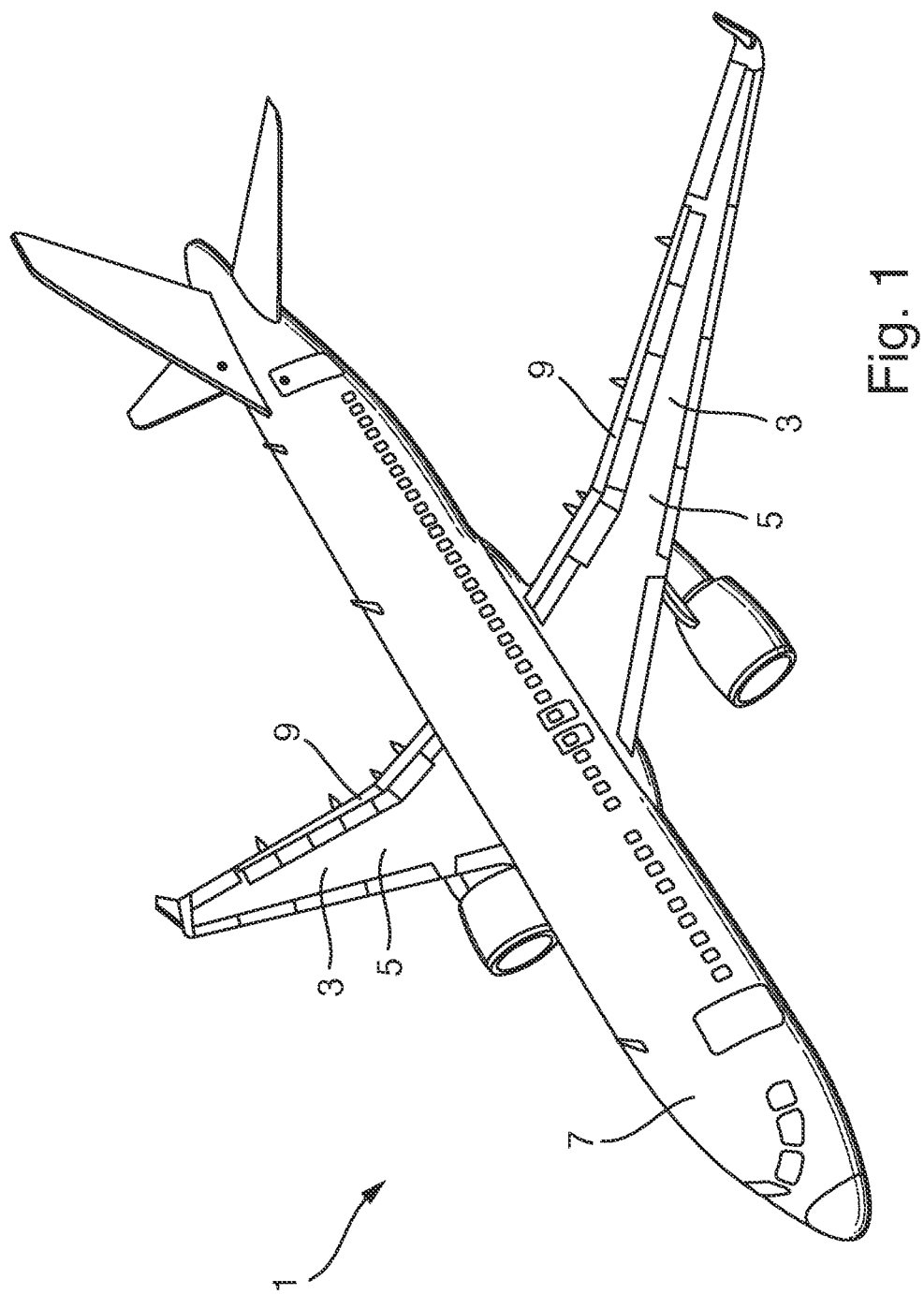

FIG. 1 shows an exemplary aircraft 1 according to an embodiment of the present invention. The aircraft 1 comprises a wing 3 including a main wing 5 mounted to a fuselage 7, and a trailing edge high lift assembly 9 movably mounted to the main wing 5.

Figure 3A:
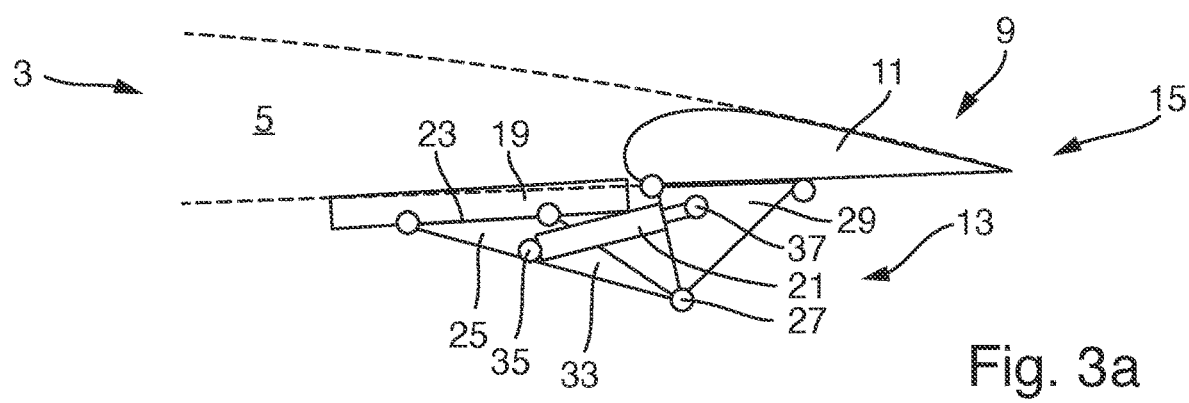
Figure 3B:
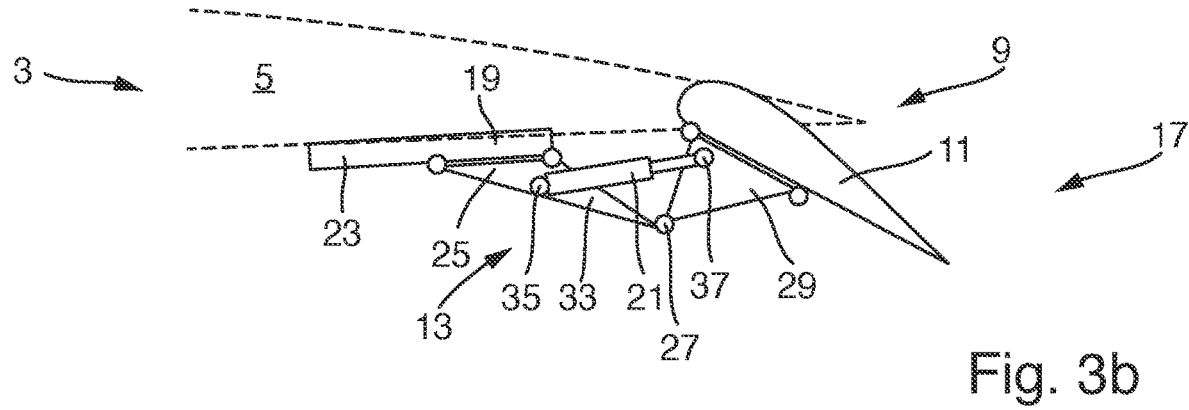
Figure 4:
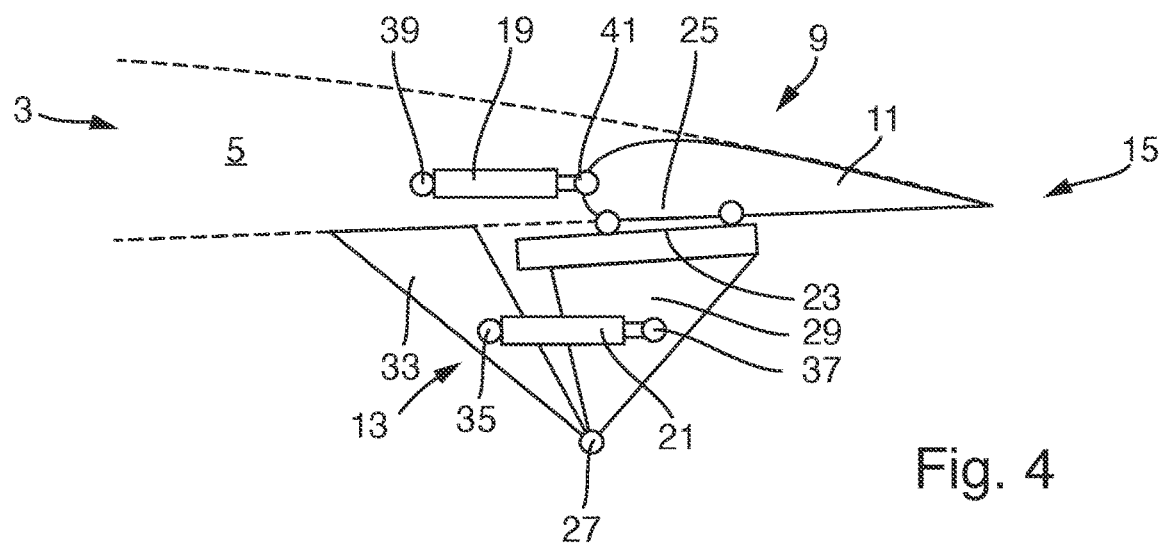

FIGS. 2 to 4 illustrate three embodiments of the wing 3 of the aircraft 1 shown in FIG. 1. The wing 3 shown in FIG. 2 comprises a main wing 5 and a trailing edge high lift assembly 9. The trailing edge high lift assembly 9 is movably arranged at a trailing edge of the main wing 5 and comprises a flap 11 and a connection assembly 13. The connection assembly 13 movably mounts the flap 11 to the main wing 5, such that the flap 11 is movable between a retracted position 15 with a reduced chord length and curvature of the wing 3, and at least one extended position 17 with an extended chord length and curvature of the wing 3. The connection assembly 13 is configured such that the flap 11 is movable relative to the main wing 5 in a decoupled linear and rotational manner, i.e., the flap 11 is movable linearly and rotationally independent from one another. In other words, the linear degree of freedom is decoupled from the rotational degree of freedom.

As shown in FIG. 2a, the connection assembly 13 comprises a first actuator 19 and a second actuator 21 for moving the flap 11. The first actuator 19 together with the second actuator 21, is configured to cause linear movement of the flap 11. The second actuator 21 alone, e.g., when the first actuator 19 is stopped, or the second actuator 21 together with the first actuator 19, is configured to cause rotational movement of the flap 11.

Further, the connection assembly 13 comprises a linear guide rail 23 mounted to the main wing 5. The connection assembly 13 further comprises a carriage 25 engaging the guide rail 23 for guided movement along the guide rail 23. The flap 11 is mounted to the carriage 25.

In the embodiment shown in FIG. 2, the flap 11 is rotatably mounted to the carriage 25 by a hinge 27 and a lever element 29. The lever element 29 is mounted to the lower side of the flap 11, such that it extends away from the lower side of the flap 11. The lever element 29 is rotatably mounted to the carriage 25 via the hinge 27. The first actuator 19 is coupled to the carriage 25 for moving the carriage 25 along the guide rail 23. The second actuator 21 is rotatably coupled to the lever element 29 in a position spaced apart from the hinge 27, to be able to rotate the lever element 29 about the hinge 27. The first actuator 19 and the second actuator 21 are supported at the main wing 5 via a rib 33 that is mounted to the main wing 5 such that it extends away from the lower side of the main wing 5. The rib 33 also carries the guide rail 23.

In the embodiment shown in FIG. 2, the first actuator 19 is a linear actuator, specifically a hydraulic or pneumatic cylinder or an electromagnetic linear motor. Likewise, the second actuator 21 is a linear actuator, specifically a hydraulic or pneumatic cylinder or an electromagnetic linear motor. Alternatively, the first actuator 19 is a gas spring actuator, such as a passive gas spring. In this case, the guide rail 23 has a stop 31 to limit linear movement of the carriage 25 along the guide rail 23, but allow rotation of the lever element 29 about the hinge 27 also after the carriage 25 hit the stop 31. The gas spring actuator is biased to push the carriage 25 towards and against the stop 31.

As shown in FIG. 2a, the flap 11 might comprise at least one further adjustable flap portion 34 that allows to further adjust the shape of the flap 11 and thus the shape of the wing 3.

The second embodiment shown in FIG. 3 differs from the first embodiment shown in FIG. 2 in that the guide rail 23 is mounted directly to the lower side of the main wing 5, while the carriage 25 engages the guide rail 23 from below. The carriage 25 is mounted to the rib 33, while the rib 33 is mounted to the lever element 29 rotatably about the hinge 27. The first actuator 19 drives the carriage 25 along the guide rail 23 and is formed as a pinion drive actuator. The second actuator 21 is in the form of a linear actuator and is coupled between the rib 33 and the lever element 29 in a position spaced apart from the hinge 27 and hinged on both ends 35, 37, i.e., rotatably coupled to the rib 33 at one end 35 and rotatably coupled to the lever element 29 at the opposite end 37.

The third embodiment shown in FIG. 4 differs from the second embodiment shown in FIG. 3 in that the flap 11 is fixedly and directly mounted to the carriage 25. The rib 33 is fixedly mounted to the lower side of the main wing 5. The rib 33 is rotatably mounted to the lever element 29 via the hinge 27. The guide rail 23 is fixedly mounted to the lever element 29. The first actuator 19 is formed as a linear actuator and is coupled between the main wing 5 and the flap 11 in a hinged manner, i.e., in a manner rotatable at the main wing 5 by one end 39 and rotatable at the flap 11 by the opposite end 41. The second actuator is formed as a linear actuator and is coupled between the rib 33 and the lever element 29 in a manner hinged at both ends 35, 37, i.e., rotatably coupled to the rib 33 at one end 35 and rotatably coupled to the lever element 29 at the opposite end 37.

By the trailing edge high lift assembly 9 according to the invention, the flap 11 cannot only be moved along a single predefined path, but can be adjusted more freely to result is multiple different shapes of the wing 3 that can be assumed during all stages of flight to optimise flight parameters such as lift, drag, structural loading and passenger comfort.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising
a main wing; and,
a trailing edge high lift assembly movably arranged at a trailing edge of the main wing, the trailing edge high lift assembly comprising
a flap, and
a connection assembly movably mounting the flap to the main wing, such that the flap is movable between a retracted position and at least one extended position,
wherein the connection assembly is configured such that the flap is movable relative to the main wing in a linear manner, a rotational manner, or both,
wherein the connection assembly is configured such that the flap is movable relative to the main wing in a decoupled linear and rotational manner,
wherein the connection assembly comprises a guide rail mounted outside and below the main wing, a first actuator, and a second actuator for moving the flap,
wherein at least one of the first actuator and the second actuator is mounted below the main wing,
wherein a rib mounted below the main wing,
wherein a lever element is provided below the flap, and,
wherein the second actuator is attached to the rib and the lever element.

2. The wing according to claim 1,
wherein at least the first actuator is configured to cause linear movement of the flap, and
wherein at least the second actuator is configured to cause rotational movement of the flap.

3. The wing according to claim 1, wherein the connection assembly further comprises a carriage engaging the guide rail for guided movement along the guide rail, and
wherein the flap is mounted to the carriage.

4. The wing according to claim 3, wherein the flap is rotatably mounted to the carriage by a hinge.

5. The wing according to claim 4, wherein the flap is mounted to the carriage via the lever element,
wherein the lever element is mounted to the flap and rotatably mounted to the carriage via the hinge.

6. The wing according to claim 5, wherein
the first actuator is coupled to the carriage for moving the carriage along the guide rail, or
wherein the second actuator is coupled to the lever element in a position spaced apart from the hinge, or both.

7. The wing according to claim 2, wherein the first actuator is a linear actuator or a pinion drive actuator, and wherein the second actuator is a linear actuator.

8. The wing according to claim 2, wherein the first actuator is a gas spring actuator,
wherein the second actuator is a linear actuator, and
wherein the wing further comprises:
a stop to limit linear movement of the carriage along the guide rail.

9. The wing according to claim 2, wherein the first actuator is supported via the rib mounted to the main wing.

10. The wing according to claim 3, wherein the guide rail is arranged directly at a lower side of the main wing.

11. The wing according to claim 3, wherein the carriage is mounted to the rib and the rib is rotatably mounted to the lever element about a hinge.

12. The wing according to claim 3, wherein the flap is fixedly mounted to the carriage.

13. The wing according to claim 12, wherein the rib is rotatably mounted to the lever element via a hinge,
wherein the guide rail is mounted to the lever element,
wherein the first actuator is coupled between the main wing and the flap, and
wherein the second actuator is coupled between the rib and the lever element.

14. A trailing edge high lift assembly for the wing according to claim 1.

15. An aircraft comprising the wing according to claim 1.

16. A wing for an aircraft, comprising
a main wing; and,
a trailing edge high lift assembly movably arranged at a trailing edge of the main wing, the trailing edge high lift assembly comprising
a flap, and
a connection assembly movably mounting the flap to the main wing, such that the flap is movable between a retracted position and at least one extended position,
wherein the connection assembly is configured such that the flap is movable relative to the main wing in a linear manner, a rotational manner, or both,
wherein the connection assembly is configured such that the flap is movable relative to the main wing in a decoupled linear and rotational manner,
wherein the connection assembly comprises a guide rail mounted outside and below the main wing, a first actuator, and a second actuator for moving the flap,
wherein at least one of the first actuator and the second actuator is mounted below the main wing,
wherein the connection assembly further comprises a carriage engaging the guide rail for guided movement along the guide rail,
wherein the flap is fixedly mounted to the carriage,
wherein a rib is arranged at the main wing and rotatably mounted to a lever element via a hinge,
wherein the guide rail is mounted to the lever element,
wherein the first actuator is coupled between the main wing and the flap, and
wherein the second actuator is coupled between the rib and the lever element.

* * * * *